(12) United States Patent
Kesseli et al.

(10) Patent No.: US 8,015,812 B1
(45) Date of Patent: *Sep. 13, 2011

(54) POWER CONVERSION SYSTEMS

(75) Inventors: James B. Kesseli, Greenland, NH (US); Thomas L. Wolf, Winchester, MA (US)

(73) Assignee: Southwest Solar Technologies, Inc., Phoenix, AZ (US)

( * ) Notice: Subject to any disclaimer, the term of this patent is extended or adjusted under 35 U.S.C. 154(b) by 475 days.

This patent is subject to a terminal disclaimer.

(21) Appl. No.: 12/026,134

(22) Filed: Feb. 5, 2008

Related U.S. Application Data

(63) Continuation of application No. 11/103,745, filed on Apr. 12, 2005, now Pat. No. 7,325,401.

(60) Provisional application No. 60/561,637, filed on Apr. 13, 2004, provisional application No. 60/565,103, filed on Apr. 23, 2004.

(51) Int. Cl.
*F01K 13/00* (2006.01)

(52) U.S. Cl. ........................................... 60/677; 60/612

(58) Field of Classification Search .................... 60/612, 60/605.1, 677–679
See application file for complete search history.

(56) References Cited

U.S. PATENT DOCUMENTS

| | | | |
|---|---|---|---|
| 4,048,012 A | 9/1977 | George et al. | |
| 4,414,805 A | 11/1983 | Walker | |
| 4,942,736 A | 7/1990 | Bronicki | |
| 5,448,889 A | 9/1995 | Bronicki | |
| 5,537,822 A | 7/1996 | Shnaid et al. | |
| 5,628,191 A | 5/1997 | Kueck et al. | |
| 6,494,042 B2 * | 12/2002 | Bronicki | 60/651 |
| 7,325,401 B1 * | 2/2008 | Kesseli et al. | 60/677 |
| 2002/0014069 A1 * | 2/2002 | Holtzapple et al. | 60/39.63 |

* cited by examiner

*Primary Examiner* — Hoang M Nguyen
(74) *Attorney, Agent, or Firm* — McLane, Graf, Raulerson & Middleton, Professional Association

(57) ABSTRACT

Power generation systems and methods are provided with features directed to various innovations including ones relating to the conversion of concentrated solar and biomass energy to electricity, load-shifting of electrical power supply systems, gas turbine devices and cycles, and power plant control systems.

8 Claims, 13 Drawing Sheets

| Control devices<br>...<br>...<br>...<br>External variables | Variable area turbine nozzle (on one or more of the series turbines) | Fuel control - to supplement solar input | Variable speed alternators with independent speed control on one or more of the series turbines | Discrete or analog control over recuperator by-pass flow circuit | Discrete of analog control over the motors driving the ground-mounted compressors |
|---|---|---|---|---|---|
| Solar Insolation, Io, change | Optimizes turbine temp when Io changes within normal ranges | Raises turbine temp when Io too low | Optimized turbine speed when Io changes within normal ranges | Active when Io too high | |
| Supply pressure change | Optimizes turbine temp when supply pressure changes | | Optimizes turbine speed when inlet pressure changes | | |
| Power Import / Export demand | | Utility Dispatcher demands power when Io too low | | | Utility dispatcher demands power reduction or |
| Component and system degredation (leaks, fouling, clearance effects) | Optimize load sharing among the series of turboalternators | Off-set degredation mechanisms, adding fuel to maintain power set-point | Optimize load sharing among the series of turboalternators | | |

Fig. 9

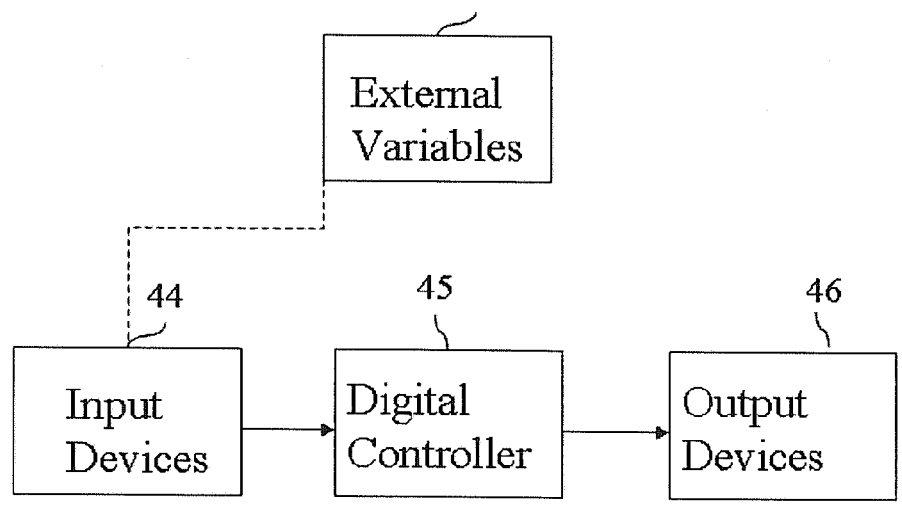

Fig. 10

POWER CONVERSION SYSTEMS

CROSS REFERENCE TO RELATED APPLICATIONS

This application is a continuation of U.S. application Ser. No. 11/103,745 filed: Apr. 12, 2005, now U.S. Pat. No. 7,325, 401, which in turn claims the benefit under 35 U.S.C. §119(e) of U.S. provisional application Ser. No. 60/561,637, filed Apr. 13, 2004, and U.S. provisional application Ser. No. 60/565, 103, filed Apr. 23, 2004. Each of the aforementioned applications is incorporated herein by reference in its entirety.

FIELD OF THE INVENTION

This invention relates generally to power generation with features directed to various innovations including ones relating to the conversion of concentrated solar and biomass energy to electricity, load-shifting of electrical power supply systems, gas turbine devices and cycles, and power plant control systems.

BACKGROUND OF THE INVENTION

The concentrating solar power industry has a three-decade long performance record, applying various engine cycles such as Stirling, Rankine, and Brayton to the task of converting solar energy into electric power. Stirling engines located on 3-meter to 11-meter diameter parabolic-dish concentrators successfully demonstrated the ability to convert the solar energy to shaft power and in turn produce electric power using an electrical generator. Rankine cycle converters, using steam or alternative organic fluids to drive a turbine, have been installed on similar parabolic concentrators as well as parabolic troughs. The Brayton cycle, or so-called gas turbine, has been installed on parabolic-dish concentrators, typically utilizing a highly modified commercial gas turbine engine with a solar receiver to absorb the concentrated solar energy and heat air. Though none of these apparatuses would be described as commercially available, fundamental thermodynamic of these prime movers has been demonstrated with a solar heat source.

FIG. 1 illustrates generic components of a system designed to convert concentrated solar energy into electricity using a "heat engine" or "prime mover" 13. Using a reflective surface, a solar concentrator 9 focuses solar energy to an intensity of between 100 and 5,000 times that normally incident on Earth. The concentrated solar power is directed on an absorbing material of a receiver built into the prime mover 13, thereby heating a fluid flowing through the solar absorber (the details are not shown). The fluid, known as a "working fluid," drives a thermodynamic "heat engine" which in turn produces shaft power. The shaft power is converted to electricity using conventional electro-magnetic generator principles.

The Brayton cycle is an example of a cycle that may be used with the power conversion system 13a of FIG. 1. In known types of such "Dish-Brayton" systems, the working fluid is air, and follows a typical path through the engine. FIG. 2 shows air entering the engine through an intake filter 1, and then into a compressor section 20. The fluid exiting the compressor is elevated in pressure to typically 3 to 6 atmospheres. The compressed air then may flow through a recuperator 7 and into the solar receiver 8, or alternatively into the receiver 8 without recuperation. The pressurized air is heated in the solar receiver to a temperature of about 800 to about 1000 degrees Celsius. A combustor, designed to burn conventional fuels, may be used at this point in the cycle to further heat the air, or make up for deficient solar input. At this high pressure, high temperature state, the air expands through a turbine stage 10, consisting of one or more turbine rotors. The turbine stage is connected by a shaft or shafts 109 to the compressor 20 and the electrical generator 21. The Brayton cycle engine operates with a continuous flow of air and heat addition, producing a proportional amount of continuous electrical power.

In summary, the solar-activated "Dish-Brayton" module operates precisely as a conventional gas turbine generation unit, with the added complexity of a component in the cycle to receive solar energy and heat the working fluid.

A related type of power conversion system is referred to as the Compressed Air Energy Storage (CAES) system. The system employs a principle of periodic compression and expansion (e.g., turbine) stages to generate power. A plant, shown schematically in FIG. 3, consists of a compressor station 20 and a turbine station 10. Fuel is burned in a combustor 22 to heat the working fluid. The CAES plant utilizes a compressor station to charge a vessel 6 with pressurized air. The air compressor station 20 would typically employ intercooling to improve efficiency. The air storage vessel may be of conventional steel construction or utilize a specially prepared geological formation. The geological formation resembles the salt domes and aquifers currently used for natural gas storage.

One of the attractions of CAES is electric utility load shifting. Energy is stored at night when utility rates are low. Then, during the day where electric rates are high and loads are generally high, the CAES plant operator may release the air pressure through the turbine-generator to generate power.

SUMMARY OF THE INVENTION

According to an embodiment, the invention provides a power plant, comprising: an uncontrolled variable heat source with an inlet and outlet which accepts air through the inlet and discharges heated air through the outlet, at least two turbines connected to the outlet to receive heated air, at least two generators connected to the at least two turbines to convert rotary motion of the at least two turbines into electrical power, the at least two turbines being connected in series such that a first reduces the pressure of air received by it and delivers it to a second and so on to define a multi-stage series of turbines.

According to another embodiment, the invention provides a power plant, comprising: an array of solar concentrating collectors, a power module mounted at the focal point of each of the array of solar concentrating collectors, a central compressed air storage device and a fluid circuit to supply compressed air from the storage device to each of the power modules, each of the power modules further including at least one turbine and a generator connected to each of the at least one turbine, each of the at least one turbine being connected to receive the compressed air supplied to the each of the power modules, the each of the power modules being configured to convey heat from a respective one of the solar concentrating collectors to heat the compressed air prior to reception by the each of the at least one turbine, a controller connected to control a speed of at least some of the power modules with at least one turbine to optimize a speed thereof responsively to at least one of a temperature and a pressure of air supplied into and/or removed from the at least one turbine.

According to yet another embodiment, the invention provides a power plant, comprising: a solar receiver configured to heat a supply of compressed air, a turbine connected to the receiver to convert a heated supply of compressed air therefrom to shaft power, the turbine including a variable area nozzle configured to control a rate of flow of the heated supply of compressed air to the turbine, a generator with a selectable load connected to receive the shaft power, a controller connected to control the selectable impedance responsively to a speed of the turbine, the controller being further configured to control the variable area nozzle, the controller being further configured to control to give priority to control of the selectable impedance over control of the variable area nozzle.

According to yet another embodiment, the invention provides an electric power plant, comprising: a central and remote compressor station delivering air to a plurality of solar concentrators, the concentrators being configured to generate electrical power from compressed air and heat generated thereby, the central compressor station including one or more electric-drive compressors, a pressure vessel for storing compressed air from the compressor station, and a controller configured to control the compressor station to modulate the total amount of electric power from the solar concentrators.

BRIEF DESCRIPTION OF THE FIGURES

The invention may take form in various components and arrangements of components, and in various steps and arrangements of steps. The drawings are only for purposes of illustrating preferred embodiments and are not to be construed as limiting the invention.

FIG. 9 illustrates control mechanisms according to an embodiment for controlling a power plant.

FIG. 10 illustrates a control system.

DETAILED DESCRIPTION OF THE PREFERRED EMBODIMENTS

Figure 1:
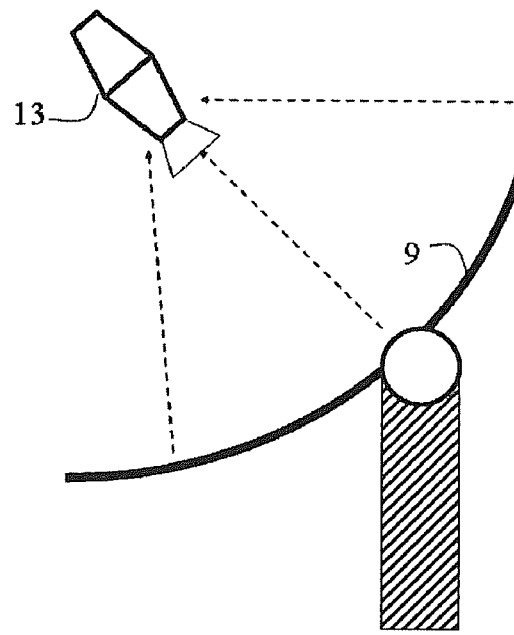
FIG. 1 illustrates a prior art concentrating solar collector.
Figure 2:
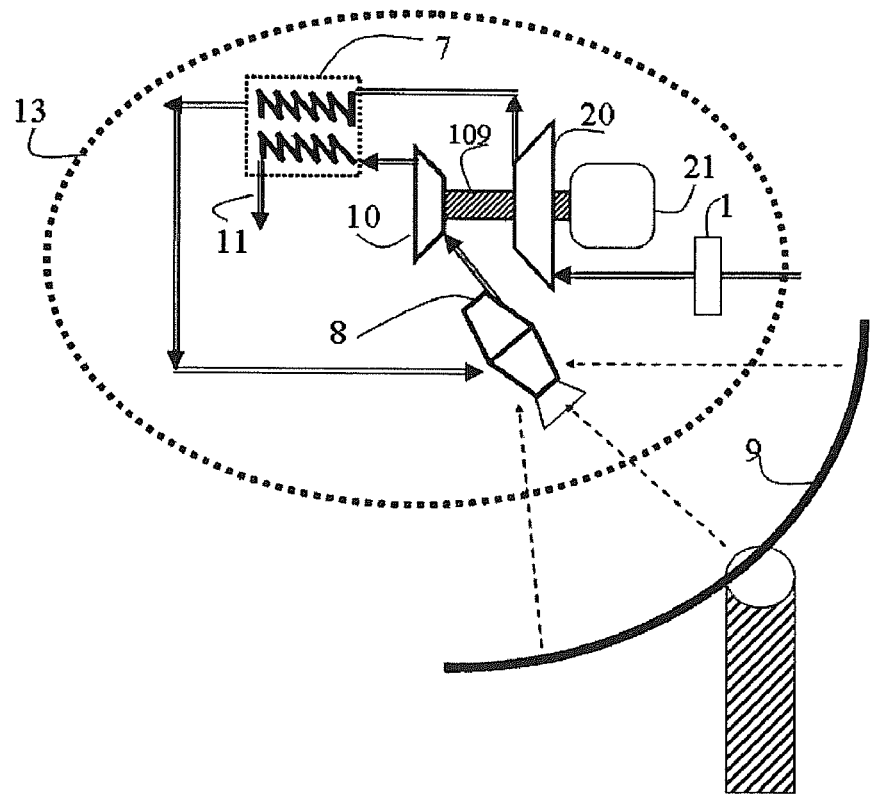
FIG. 2 illustrates a prior art collector with a power unit.
Figure 3:
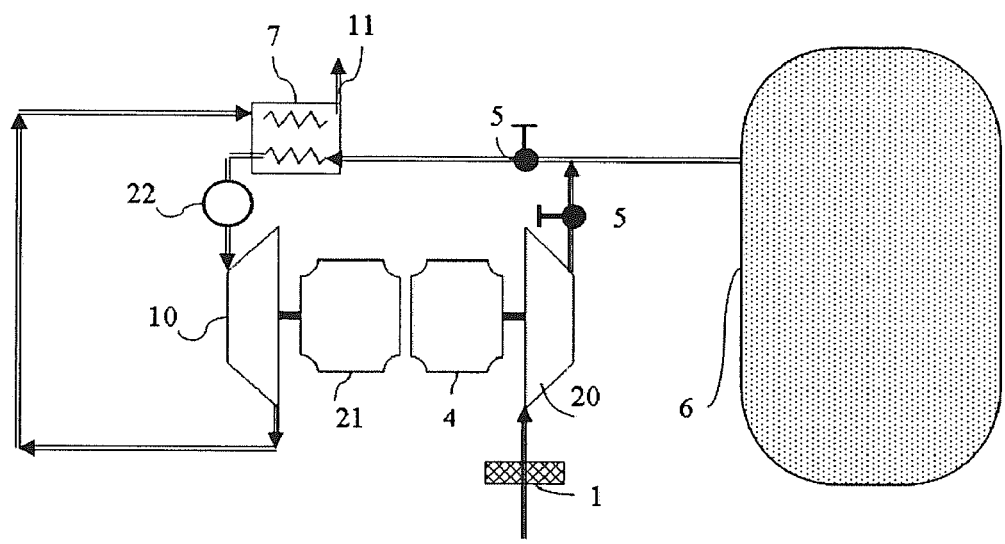
FIG. 3 illustrates a prior art compressed air energy storage system.
Figure 4:
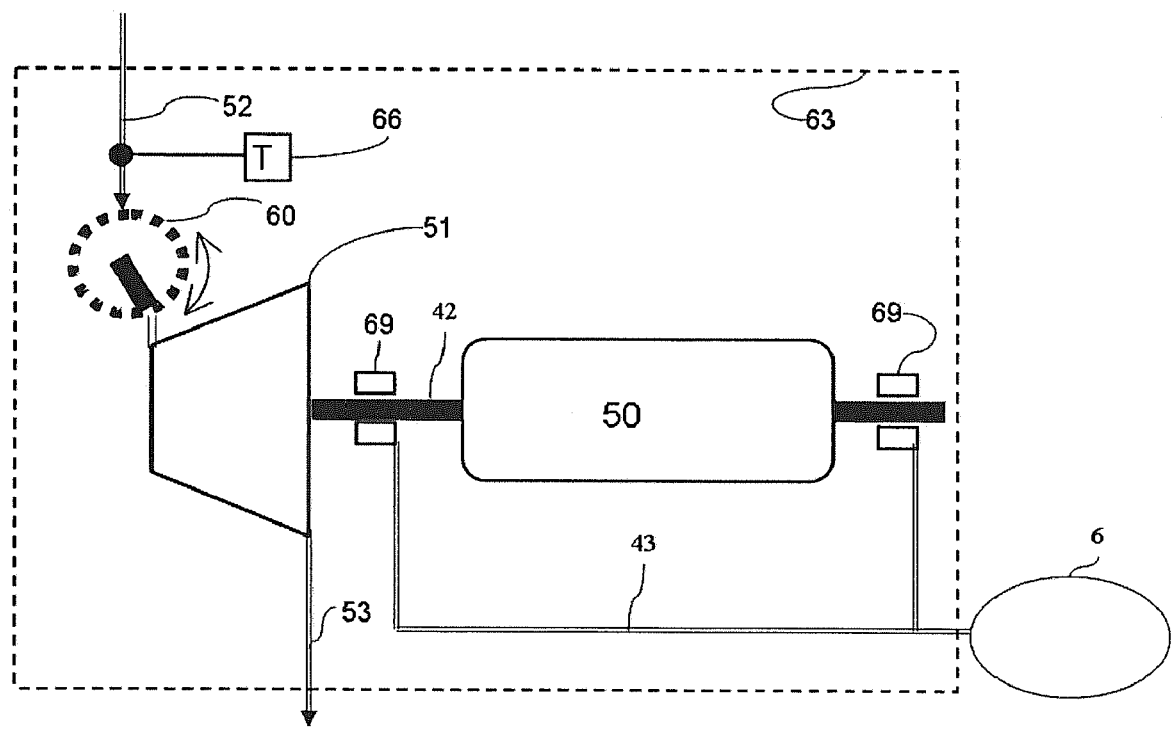
FIG. 4 illustrates a turbine module unit.

A turbo-alternator is a device that extracts energy from an expanding gas, creating shaft power to be converted to electrical energy. FIG. 4 is a schematic representation of a typical turbo-alternator. The turbo-alternator 63 includes a turbine 51 and an alternator 50 on a common shaft 42 supported by bearings 69. The invention will be described herein primarily in reference to the embodiments wherein an alternator is employed, indicating a preferred type of electrical power generator, however, it will be recognized that an alternator is not the only type that can be used in the embodiments described herein and that and all manner of electrical power generators are contemplated. The alternator 50 converts the shaft power derived from the turbine 51 to electrical power, exerting electromagnetic torque on the shaft 42 of the rotating group. The fluid enters the turbine section through conduit 52 and leaves through conduit 53. The temperature of the fluid entering the turbine is measured by a sensor 66 located in conduit 53. In addition, or alternatively, the exiting flow temperature may be measured. For example, the exiting flow temperature may be used for calculating or inferring the inlet temperature.

The turbine stage may incorporate a variable position nozzle 60 to efficiently regulate the flow through the turbine. Though various types of bearings could meet the rotor support requirements, air-bearings represent the preferred embodiment. The air supply 6 provides ample cool air through service line 43 to the bearings 69 of the turbo-alternators 63, e.g., prior to start-up and after shut-down to assure long operating life.

Figure 5:
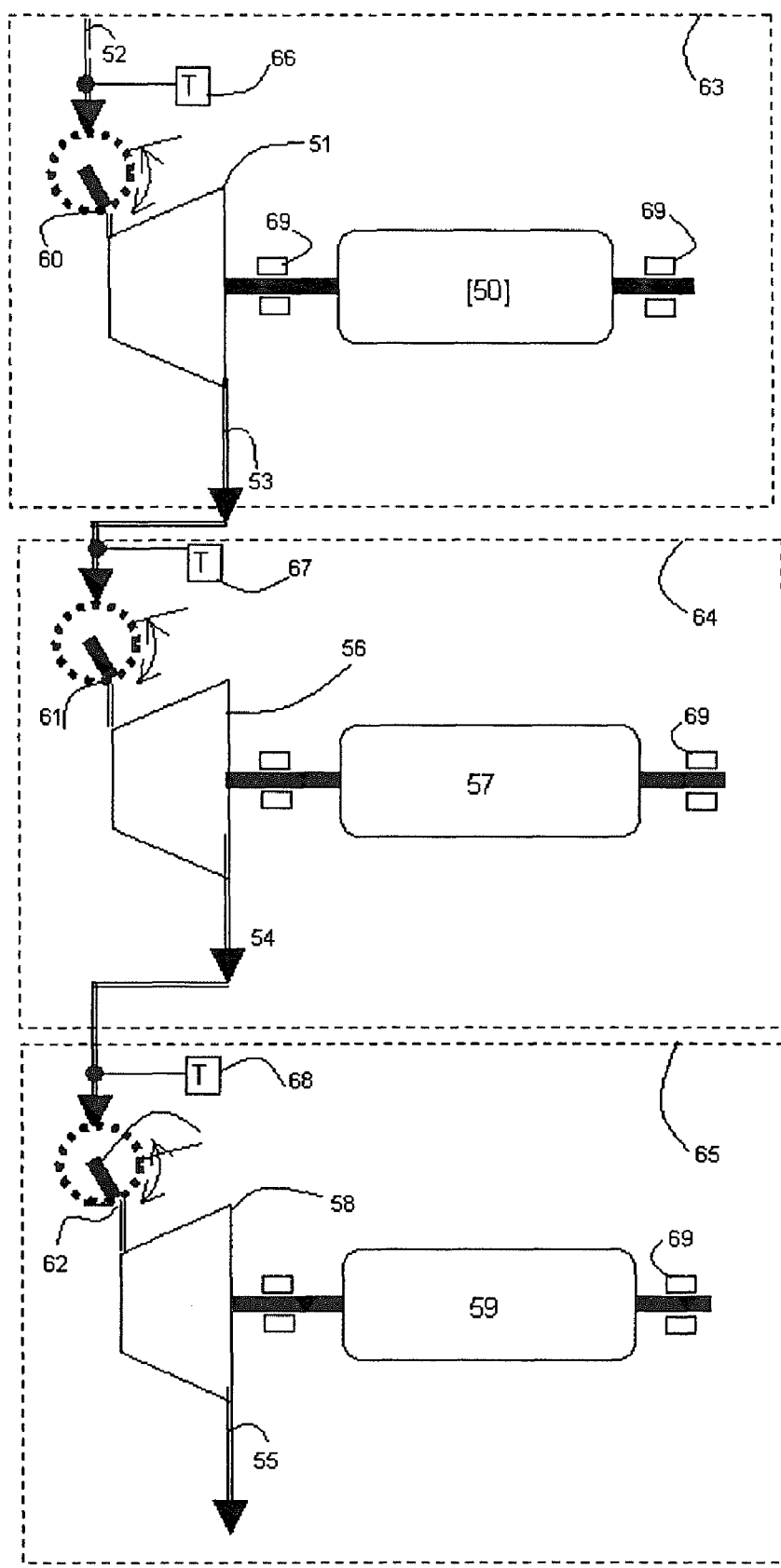
FIG. 5 illustrates a turbine module with multiple units.

A series of turbo-alternators may be arranged to optimally recover energy from a supply or source of high-pressure air. FIG. 5 illustrates a system of three turbo-alternators 63, 64, and 65 operating with the turbines 51, 56, and 58 in a series flow circuit. This mechanical arrangement converts the pressurized air and heat from a solar absorbing device to electricity. The series arrangement permits efficient expansion from a high pressure air source and the number may be changed in dependence on the pressure ratios involved. For lower pressure air sources, one or two series turbo-alternators are appropriate, while for exceptionally high-pressure sources; four or more stages of expansion may be required for efficient energy conversion, while maintaining safe and reliable turbine peripheral speeds.

In FIG. 5, the high-temperature, high-pressure air entering each turbine stage may be controlled by variable area nozzles 60, 61, and 62. Adjustments to the nozzles improve efficiency and conserve supply air under conditions of varying solar input and pressure. Heated supply air enters the power train through conduit 52, passes through nozzle 60 and then enters the turbine rotor. The exiting gas, in conduit 53 proceeds directly into nozzle 61 and turbine rotor 56 of the second turbo-alternator 64. Similarly, the gas exiting turbo-alternator 64 flows through conduit 54 into turbine nozzle 62 and turbine rotor 58. For this three stage turbo-alternator, the gas leaving the final turbine has been reduced to nearly ambient pressure. In this system of turbo-alternators, each turbo-alternator may be independently controlled to optimize performance.

Figure 6:
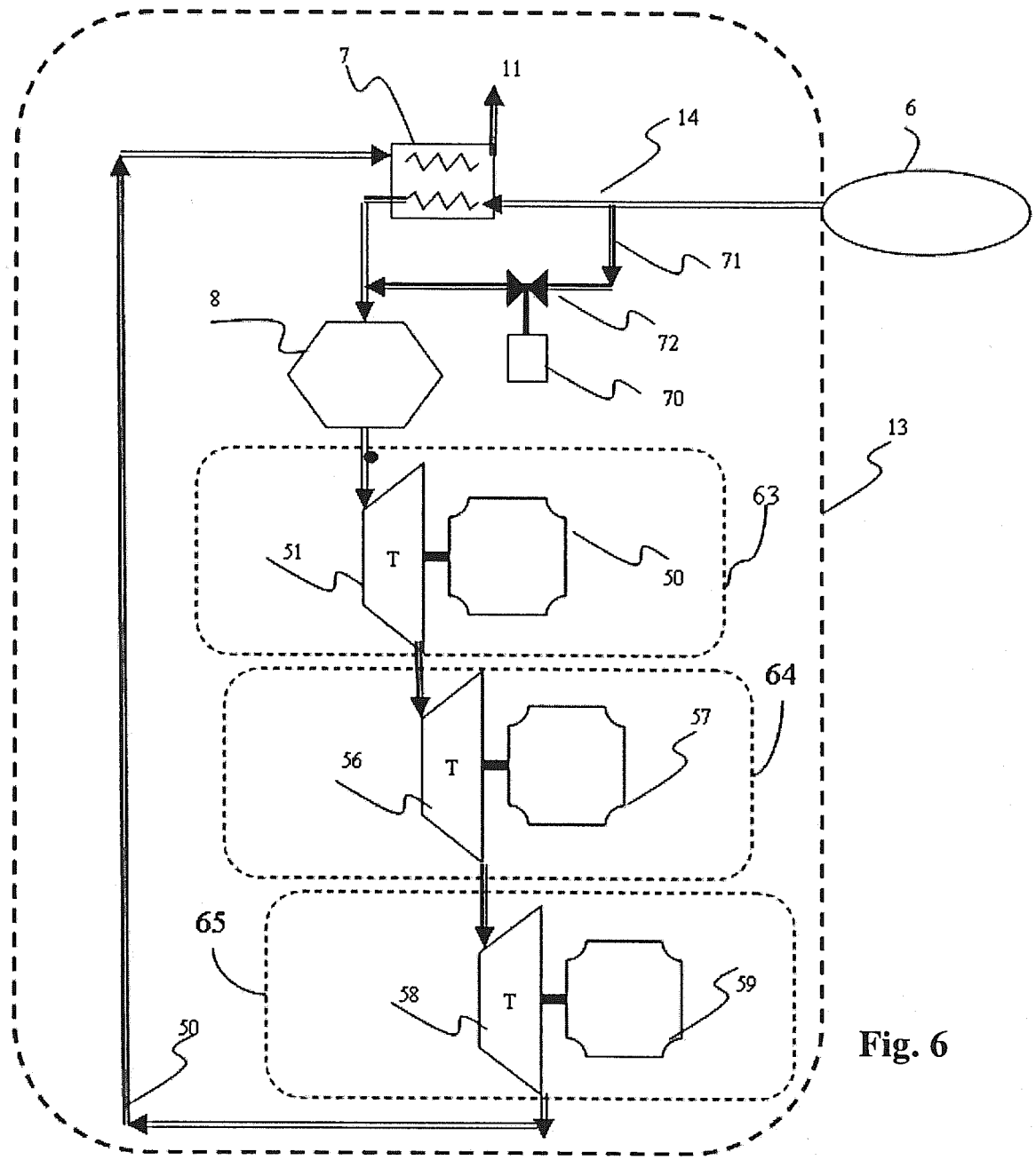
FIG. 6 illustrates solar power module.

FIG. 6 describes the principal flow circuit of the Power Conversion Module 13. Pressurized air enters the module from a pressurized source 6. The air flows through a network of fixed and flexible conduit 14 to a recuperator heat exchanger 7. The recuperator 7 is a heat exchanger that transfers heat from the high-temperature low-pressure turbine exhaust gas to the cooler high-pressure supply air. After exiting the recuperator at an elevated temperature the gas flows into the hybrid solar receiver 8. The solar receiver absorbs highly concentrated solar energy, transferring the heat to flowing gas. Note, the solar receiver may also be a hybrid device that receives heat from a solar source and a fuel combustion source. Fuels such as hydrocarbons or hydrogen-based fuels are typical.

The air exits the hybrid receiver 8 at the maximum cycle temperature and flows into the first turbine 51 of the first turbo-alternator 63. The first stage turbine delivers its exhaust to the inlet of the second stage turbine 56 of turbo-alternator 64, while the second turbine delivers flow to the third turbine 58 of turbo-alternator 65. The exhaust gas from the last stage turbine flows through conduit 50 into the low-pressure side of the recuperator 7. The exhaust from the recuperator 7 is dumped to atmosphere through conduit 11.

Figure 7:
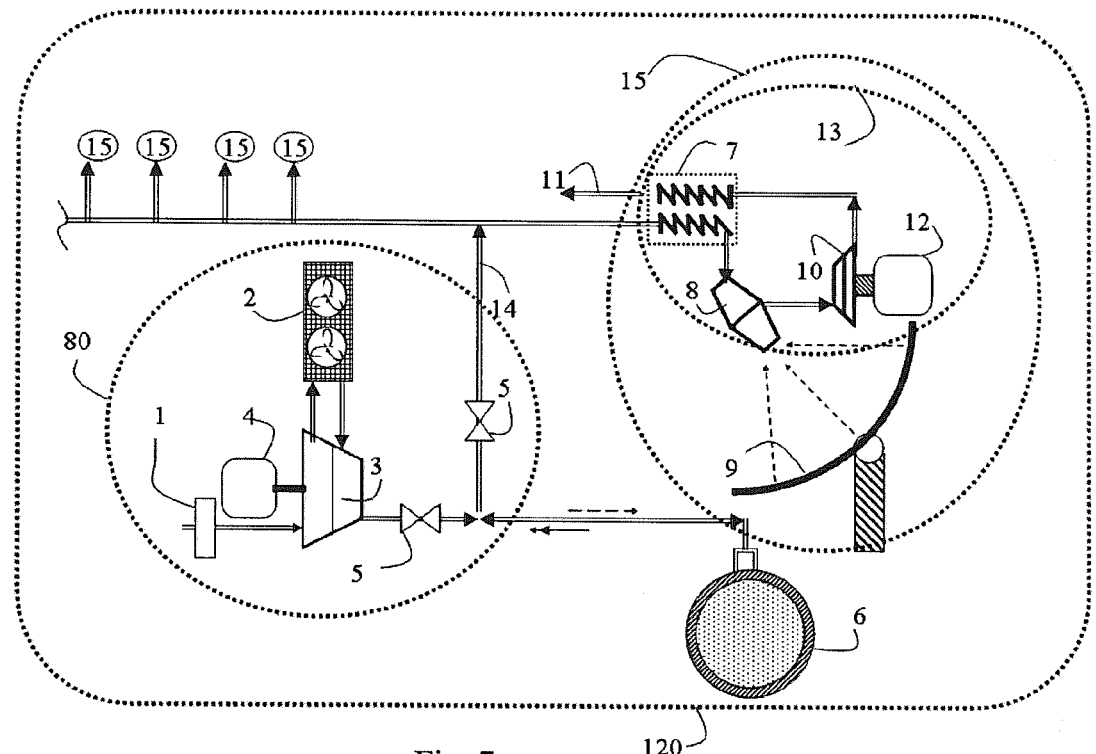
FIG. 7 illustrates multiple solar power modules configured in a power plant.

Referring to FIG. 7, a Power Plant 120, includes one or more Power Conversion Modules 13. In the embodiment shown, there are multiple power conversion modules 13, each power conversion module 13 being mounted on a solar concentrator 9 to form an array of Dish Modules 15. A central Compressor Module 80 includes an air storage vessel 6 with interconnecting piping 14 to supply air to the Dish Modules 15. Ambient air is compressed by the Compressor Module 80 and supplied to either or both the storage vessel and the network of piping leading to the Dish Modules. The Compressor Module 80 includes a multistage compressor 3, a motor drive 4, an inlet filter 1, and an intercooler 2 employed in the fashion discussed above with respect to CAES.

Pressurized air from the Compressor Module 80 or the storage vessel 6 flows through the conduit 14, which may involve conveyance over a considerable distance, to the parabolic concentrator 9. Valves 5 positioned along conduit 14 may be provided to control a mode of operation. The valves 5 may be manual or automatic. Each parabolic concentrator 9 with Power Conversion Module 13 may contain suitable controls to align the device with the sun and to regulate the gas temperatures to achieve efficient and reliable electric power generation.

Preferably, maximum solar-to-electric conversion efficiency is maintained despite changes in the external environment. Four categories of external variables are listed below.

1. Insolation: Solar power input varies with time of day and environmental conditions.
2. Source pressure: In a typical operating mode, the air storage pressure declines over the course of the operating period. As pressure declines, the turbine inlet temperature will rise to a maximum permissible value.
3. Utility interface: The optimum operating regime is dependent on a current price of electricity as well as the other factors. Thus, the daily price of electricity or other utility grid demands may impose operational requirements on the Power Plant.
4. Changes in the system such as degradation of the Power Conversion Module due to use may lead to variations that require control system adjustments. Degradation may be the result of leakage of high pressure gas, fouling or clogging within the heat exchangers, or stress-related distortion causing critical clearances within the turbomachinery to open.

Preferably a system will adapt to such changes with an ultimate goal of optimizing average cash flow. A proposed mechanism for achieving such an economic optimum may include one or more of the following five objectives.

1. Maintaining rated turbine inlet temperature despite variations in heat input (e.g., some heat sources naturally vary, such as solar input) and supply pressure (e.g., CAES storage subsystems may vary over time).
2. Constraining alternator power and receiver temperature to maintain safe operating parameters especially during extreme heat input conditions (e.g., high solar insolation).
3. Maintaining power output operation during low or no heat input by supplementation using alternative heat sources such as hydrocarbon or hydrogen-based fuel.
4. Operating with optimal prime mover conditions given external constraints, for example, in the preferred embodiment that uses turbines, operating with optimal turbine rotor tip speed, given existing system pressures and temperatures.
5. Maintaining global control of overall power plant electrical output to conform to the utility demands.

Figure 8:
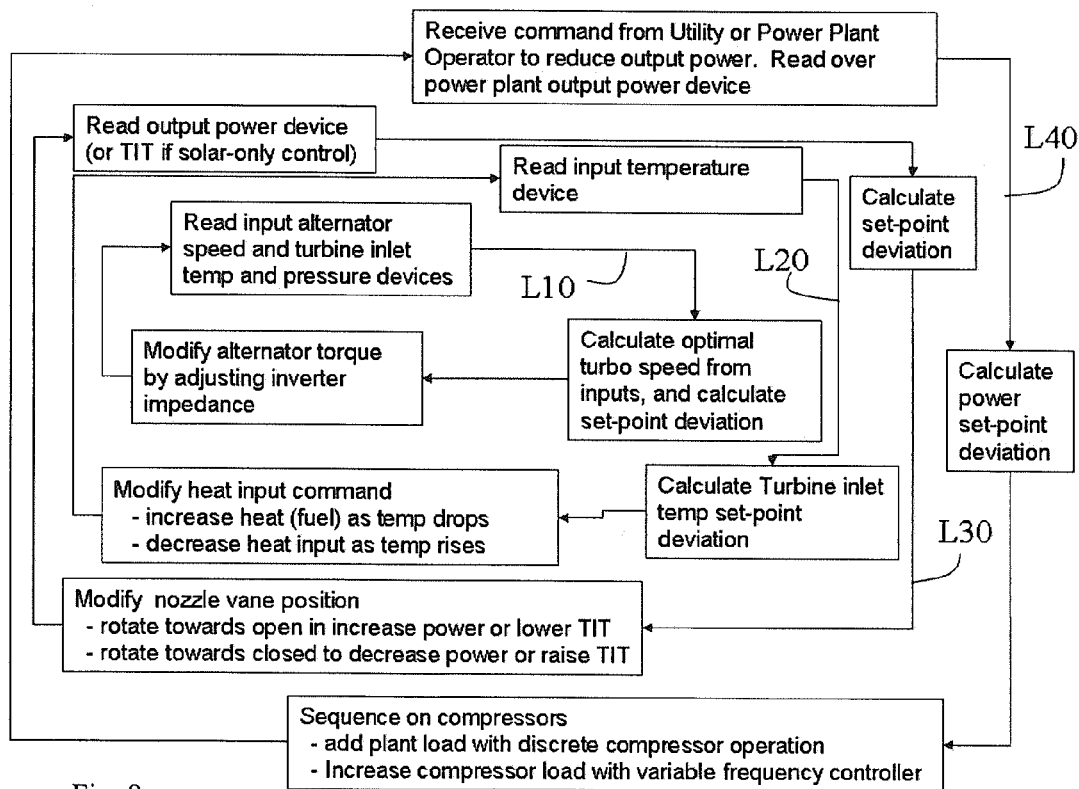
FIG. 8 illustrates a layered control regime for controlling a solar power plant.

A control scheme embodiment is illustrated at a high level in the form of a priority hierarchy in FIG. 8. Three nested levels of control functions are shown as follows.

Motor speed control L10: The speed of the prime mover and associated hardware, for example, turbine shaft (tip) speed. Note that there may be modifiable speed ratios, as may be provided by means of a transmission, between the speed of the prime mover and the speed of the power generator or other associated hardware. In the preferred embodiment, this is the innermost or fastest layer of control. It allows the speed of the prime mover to be controlled directly by varying the load for example by varying the impedance of an alternator or by varying the transmission ratio of another type of load such as a positive displacement pump. In the preferred embodiment, the system provides electrical power so the most convenient means known is to vary alternator impedance, but other embodiments are also contemplated.

Energy input source mix L20: This is the mix of energy inputs, for example the rate of supply of hydrocarbon or hydrogen fuel supplements the otherwise variable solar input. This may be accomplished by means of any suitable selectable heat supply such as a variable flow natural gas burner, variable-rate heat exchanger from a buffered heat source, etc.

Inlet temperature control L30: This refers to the temperature of the inlet of the prime mover, in the preferred embodiment, for example, a turbine. More specifically this refers to the modulation of the system in response to input heat power to optimize efficiency since such variations may otherwise cause the system to become inefficient (or unsafe) due to variations in the input heat power. Two controlled parameters are illustrated: modulating a recuperator bypass and modulating a characteristic of the prime mover to maximize its efficiency at lower input power levels. In the context of the preferred embodiment, a variable area nozzle may be provided for the turbine prime movers discussed earlier. This is discussed in detail below. The nozzle may slow the rate of flow into the turbine when input power fails to maintain optimum efficiency of the turbine.

Import/Export power management L40: This refers to the overarching control for achieving optimum economics based on the time variation of the cost of electricity, the load, the storage capacity and level, etc. The final controls involved in this layer of control include operation of the compressor motors that store compressed air in the CAES subsystem, attachment to external loads, and activation of the power generation facility subsumed under the inner control functions L10-L30.

Note that the control priority indicated by FIG. 8 is a preferred embodiment, but is by no means essential to the optimization goal identified above. The layered structure discussed above illustrates how control of the many variables can be organized such as to reduce the complexity so unwanted controls states are avoided and to take advantage of the relative time scales of the different final controls. For example, the variable alternators respond almost instantly, involves little wear or parasitic energy consumption, so prioritizing this level of control has advantages that should be clear with a view to the above and following discussion.

FIG. 9 provides a template for discussing the various control processes of the system. In addition to these control elements of the Power Conversion Module, the solar concentrator is assumed to incorporate a control system to maintain alignment with the sun throughout the day period.

FIG. 10 shows a generalized control system including one or more control inputs 44, one or more controllers 45, and one or more final controls or output devices 46. Preferably, the controller 45 is a programmable digital controller which may provide feedback, feedforward, model-based, or any other type of control function. The control functions may be performed by separate controllers for the various elements of the system, or, multiple control functions may share common hardware.

Input devices 44 may include one or more of the following embodied in analog and/or digital types: temperature sensors, pressure sensors, frequency counters, position indicators, current sensors, voltage sensors, switch position encoders, alarm indicators, etc. The output devices 46 may include one or more of the following embodied in analog or digital types of devices: solenoids, progressive linear or rotary actuators, rheostats, variable frequency motor drives, pneumatic switches, digital message generators, alarm outputs, etc.

Figure 11:
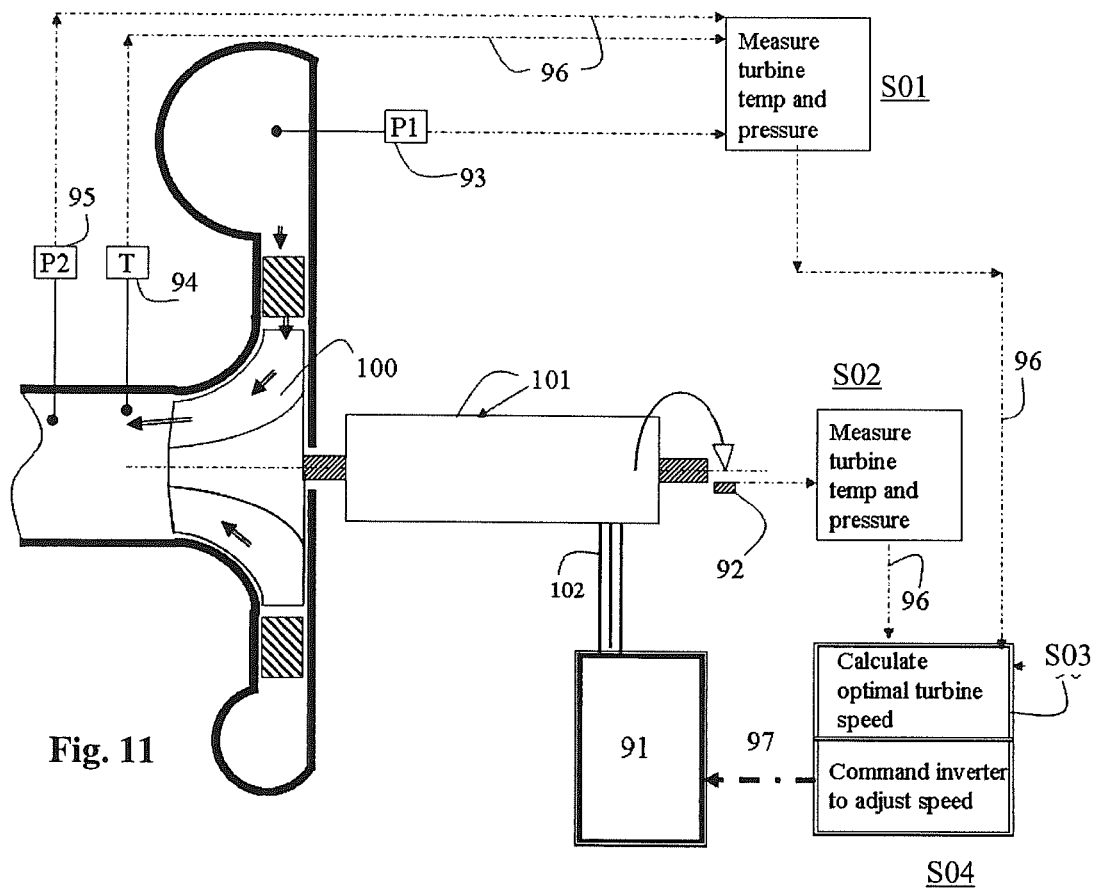
FIGS. 11 and 12 illustrate a turbine generator and associated controls according to corresponding embodiments.

FIG. 11 illustrates a closed control loop for the turbine 100 and the alternator 101 connected to the electrical load through a DC-AC inverter 91. The alternator frequency may be rectified and three-phase DC power may be delivered to the inverter 91 by electrical wires 102. The fastest feedback loop within the control system 90 may be the interaction between the turbine 100 speed and the torque exerted on the alternator 101. During operation, inlet and outlet pressure are measured by respective pressure sensors 93 and 95. Outlet temperature is measured by a temperature sensor 94. Shaft speed or frequency is measured by a suitable sensor 92, for example, a Hall-effect frequency transducer. Within the controller 45, the turbine's efficiency may be correlated against thermodynamic parameters derived from the input signals from the sensors 92-95. The correlation may take the form of either a look-up table or use analytical relationships computed by floating point operations or any other suitable means.

Signals from the measurement devices are read in steps S01 and S02 and an optimum turbine speed calculated in step S03 to generate an error signal. From the error signal, a deviation from the optimum is derived from appropriate relationships stored in the controller 45 and an adjustment command generated S04 and applied to the inverter 91, causing its impedance to be modulated accordingly. The inverter impedance changes the torque on the shaft, thereby moving the turbine speed toward its optimum for the given input state. This loop may operate rapidly and continuously without necessarily being affected by external conditions other than provided by the illustrated inputs. This illustrated method of control may be active simultaneously on one or multiple turbo-alternators operating in series. Note that the derivation of an optimal turbine speed based on the characteristics of the given turbine and the existing external conditions may be performed based on principles and factors as would be understood by persons skilled in the art and, therefore, the details need not be expanded here.

Figure 12:
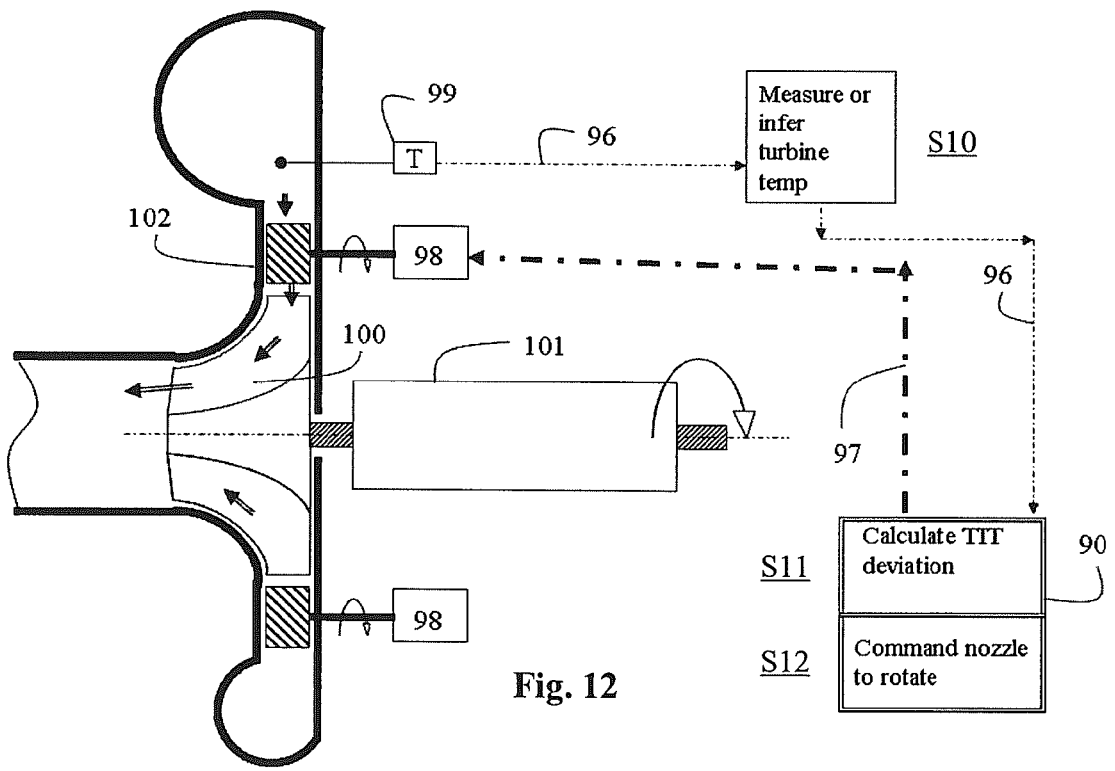

The turbine inlet temperature is affected by the system variables listed in FIG. 9. Preferably, the system maintains the highest permissible turbine inlet temperature to achieve high conversion efficiency. The permissible temperature level is dictated by the materials used in the turbine and receiver among other things. To maintain optimal inlet temperature, the controller 45 may control a variable position nozzle, as shown in FIG. 12. Unlike a simple throttle valve or regulator that dissipates energy, the variable position nozzle changes the flow angle entering the turbine rotor as discussed in more detail below. The result is a change in flow capacity for the turbine, with minimal impact on efficiency. The actuation of the nozzle position provides a degree of freedom to control the external variables, and achieve the maximum possible electrical power (maximum efficiency). In response to a change in pressure or solar insolation, the actuator 98 positions the nozzle 102 to effect more or less gas flow through the turbine. A direct measurement (or a computed inference) of the turbine inlet temperature 96 provided in step S10 may be transmitted to the controller 45. The controller 45 then calculates a deviation S11 and generates a command to control the nozzle S12 accordingly to compensate for the deviation. Note that the reason inlet temperature may be inferred is that in some applications where turbine inlet temperature is very high, it is preferable to infer the turbine inlet temperature from downstream measurements.

The nozzle control strategy allows the Power Conversion Module to adapt to degradation such as leakage, the relaxation of clearances within the turbomachinery, and additional pressure drop in the components caused by fouling or plugging of the heat exchangers. For example, in the event of gas leakage loss from the receiver, the Power Conversion System will not loose capacity. The response of the microprocessor will be to modulate open the turbine nozzle vanes. The only negative consequence is the more rapid consumption in supply pressure. This method of control may be active simultaneously on one or multiple turbo-alternators operating in series.

During conditions of low solar availability, heat may be added to the working fluid for example by modulating a fuel combustor to inject additional heat into the working fluid entering the turbine inlet, thereby raising the inlet temperature. In a Hybrid Mode, a predefined electrical power output may be provided which indicates an operating point where solar input is regarded as insufficient.

Figure 13:
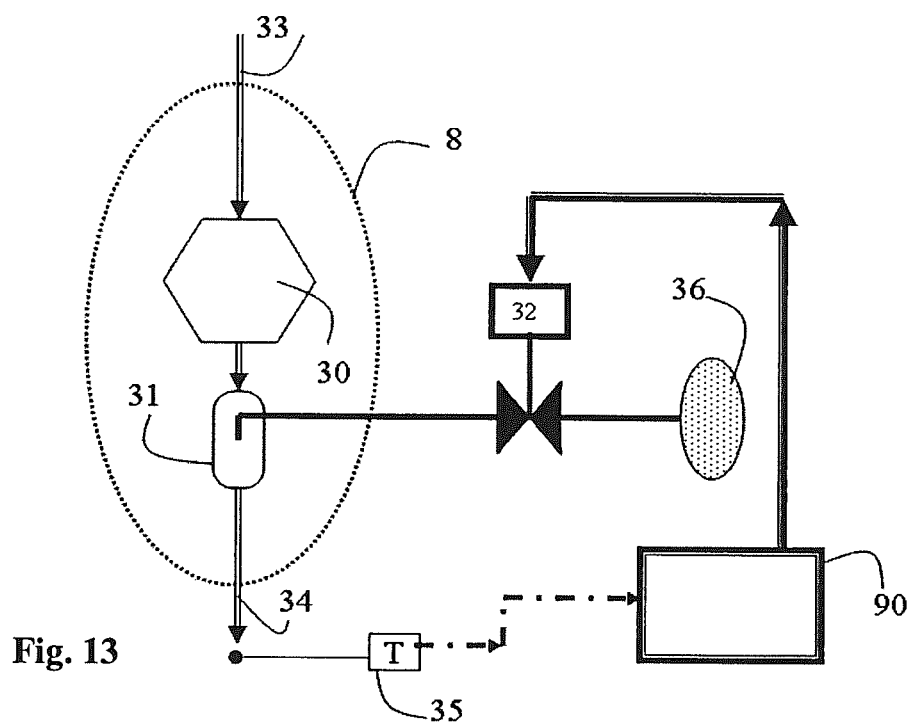
FIG. 13 illustrates supplementary heat control subsystem.

FIG. 13 illustrates a generalized schematic for the combined use of solar and supplemental heat operation. The system includes plumbing 33 to supply working fluid, from the recuperator, at high-pressure. The gas first enters a receiver 30, and then flows into a combustion device 31. The temperature of the gas in conduit 34 is sensed by a temperature sensor 35, or may be inferred from downstream state measurements. To acquire the power set point, fuel flow from supply 36 is modulated by actuator valve 32, thereby controlling the air temperature delivered by the inactive or partially active solar receiver (not shown). While measuring (or inferring) turbine inlet temperature, the fuel valve 32 is modulated, for example by employing a typical proportional-integral-differential (PID) algorithm to acquire a turbine inlet temperature equal to predefined set-point. The Hybrid Mode fuel control operates in conjunction with the turbine inlet temperature control loop discussed earlier. If the power set point is not achieved at the prescribed turbine inlet temperature, the variable position nozzle 98 (FIG. 12) may be opened incrementally. The Hybrid Power Control loop may operate outside and at a slower rate than the Optimal Turbine Speed Loop described above.

In the preferred embodiment, the multiple turbo-alternators are controlled independently. Because each alternator has an operational limit bound by power (amperage) and rotational speed (stress), the variable position nozzle 98 (FIG. 12) and speed control (impedance control) allow the alternators to maximize their output by sharing the load. Depending upon external variables such as heat (solar or fuel) input and supply pressure, component degradation, etc., the optimal operating conditions of the series of turbo-alternators may be achieved by refined adjustments to the variable position nozzle and impedance settings. For the series of three turbo-alternators, shown in FIG. 5, a high solar insolation condition may maximize first stage turbine inlet temperature 52 and the alternator 50 output power. With these conditions at their maximum, overall output power is limited and there is a risk of mechanical damage to the turbine and receiver hot section and alternator, due to excess current and speed. Under such conditions the nozzle 60 may be opened and the nozzles 61 and 62 closed, to maintain maximum turbine inlet temperature, while transferring a portion of the first stage 63 turbo-alternator power to the lower stages 64 and 65.

Figure 14:
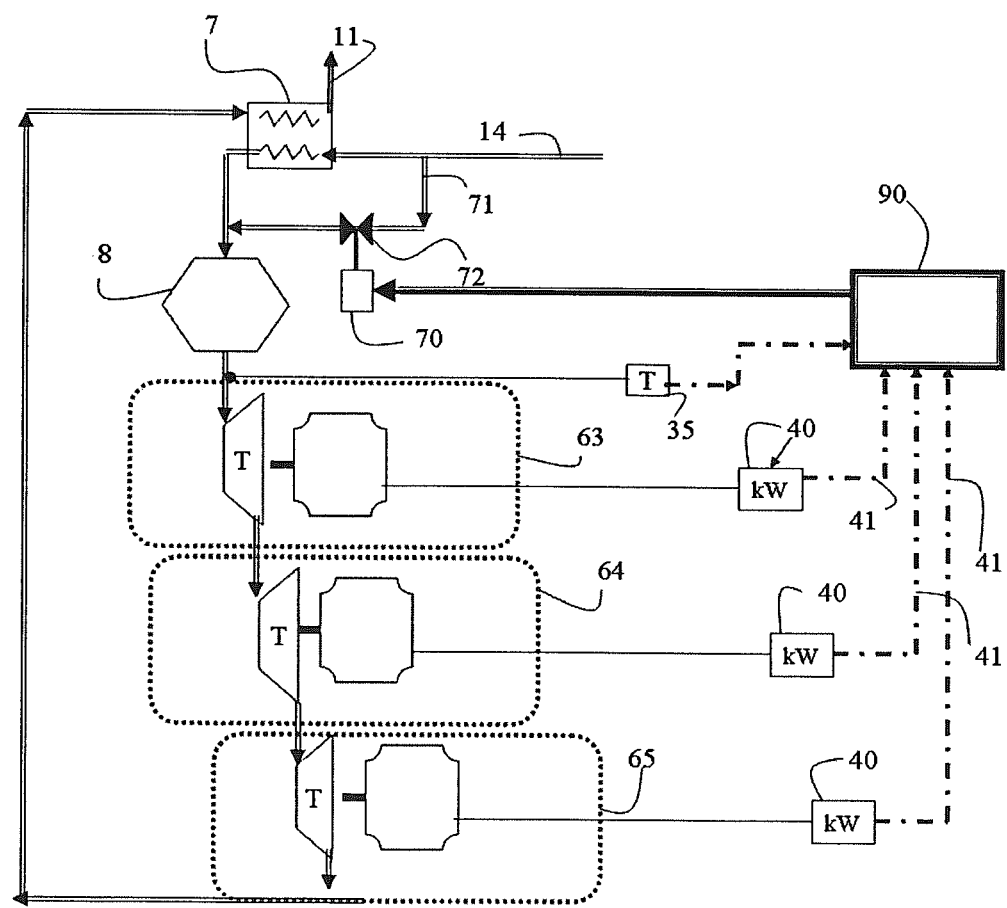
FIG. 14 illustrates a recuperator bypass control subsystem.

An additional degree of freedom for control of the system may be to limit the alternator output power under conditions of extreme solar input as described now with reference to FIG. 14. The solar insolation levels for a given region vary on a statistical basis, ranging to as high as 1100 W/sq. meter. Rather than design for these rarely achieved levels, setting the design specification for a more nominal maximum may result in improved annualized efficiency and cost. To contend with the conditions created by insolation levels over the maximum defined by the product specification, a conduit 71 and control valve 72 may be configured to by-pass flow around the recuperator 7. During normal operation, power measuring device 40 transmits the measured reading over wires 41 to the controller 90. When the signal indicates that safety limits have been exceeded, the actuator 70 is commanded to open, permitting the induction of cooler air into the solar receiver 8. A second condition when actuator 70 might be engaged occurs when the supply pressure is so low that the nozzle is fully open, yet temperature sensor 35 exceeds its maximum set-point.

The invention provides a practical means of managing the power exported from the hybrid solar station in a manner that gives utility operators flexibility to manage the normal daily power supply and demands. To gain utility acceptance, a valuable feature of a solar-electric power plant is to have dispatachability; the ability to quickly ramp up or curtail power export. Likewise, in smaller village or island power grids, the ability to responsively control export power is a critical economic advantage of the system.

A method for controlling the delivery of power from the electric generating station may be provided, without limiting the input power from the solar or other heat source. As described in the preceding paragraphs, each power conversion module is controlled in a manner so as to maximize its electricity generating capacity during periods of solar availability. Under some conditions, the electric power generated from the power conversion modules exceeds the demand from the utility operator. Under such conditions it is the advantage of this invention that no solar energy is wasted, rather it is converted by the Dish Modules and stored as compressed air.

Figure 15:
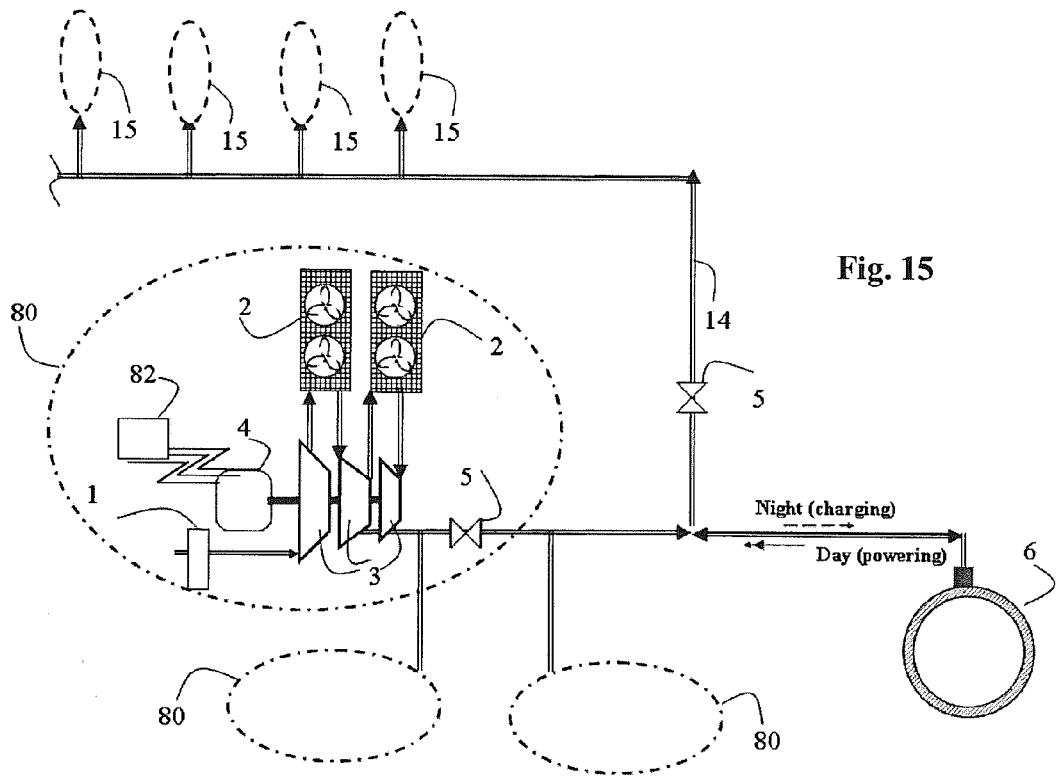
FIG. 15 illustrates a power plant.

FIG. 15 describes the central compression system, composed of a discrete number of air compressors 80, a storage vessel or air receiver 6, and the necessary interconnecting piping 14. The central air compression station delivers high-pressure to the piping distribution system 14. The air supplied to the solar concentrator-mounted power conversion system 15 may be drawn from a ground-mounted pressurized storage vessel 6 or a running air compressor 80. The motor 4 that drives the compressor 3 may have a variable frequency drive 82 to permit analog control over the compressor speed and hence power consumption. Load regulation employing variable frequency drive power converters on the compressor motors, permits finer control over the power delivered from the overall power plant.

Depending upon the demands from the utility operator, the compressors 80 may be sequenced on or off or using a variable frequency drive 82, commanded to reduce capacity. For example, under periods of high electric power demand, all compressors will be off and the stored air in vessel 6 is bled to the Dish Modules. Conversely, if the utility operator wishes to curtail power export, or the monetary value of the power generated is low, the compressors may be sequenced on, thereby storing the power generated from the Dish Modules.

Figure 16:
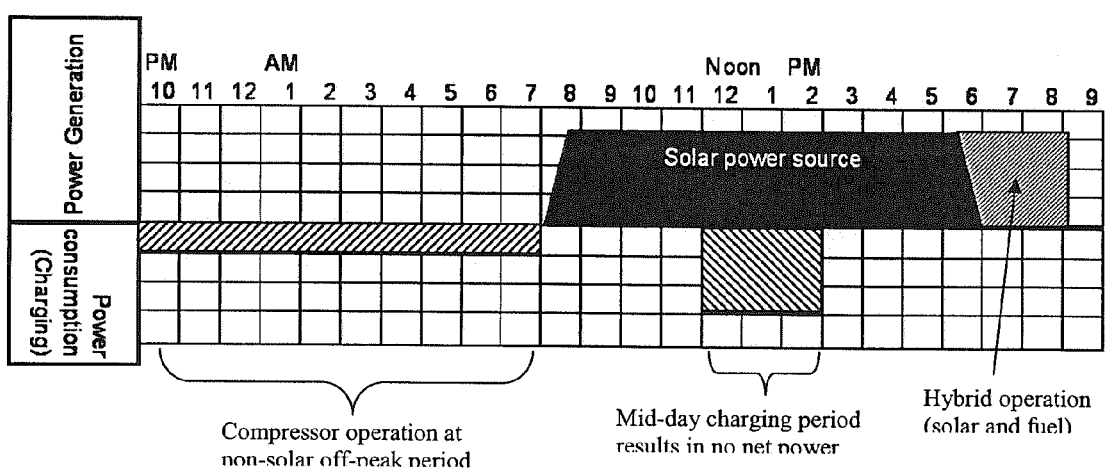
FIG. 16 illustrates a control regime for interfacing a power plant with a utility.

FIG. 16 describes one example where in the compressors' electric power consumption is used to shape the real-time power exported from the solar power plant. In this case the blocks of energy consumed, below the reference datum (negative), indicate the power consumed by the compressors. The blocks of energy generated by the Dish Modules, by solar or hydrocarbon fuel, are shown above the reference datum (positive). The net power imported and exported to the utility grid is the sum of the negative and positive energy blocks. This example illustrates a possible scenario wherein the utility demand or electric sell price dictates that no power is to be exported in the early afternoon.

This nested loop arrangement is stable and properly constrained as long as the variable nozzle vanes operate within their physical limits of rotation, between the maximally open and maximally closed. Under conditions where supply pressure is too low, the power set-point and turbine inlet temperature set-point can not be satisfied once the nozzle vane reaches its full open position. In this condition, the system is no longer capable of safe power generation and action must be taken to shut-down. Shut-down involves the command to close the fuel valve, track-off sun, and close the air valve. During the normal shut-down procedure, it is typical to maintain supply air pressure to the cooling accessories located at the focal plane of the parabolic solar concentrator.

Figure 17:
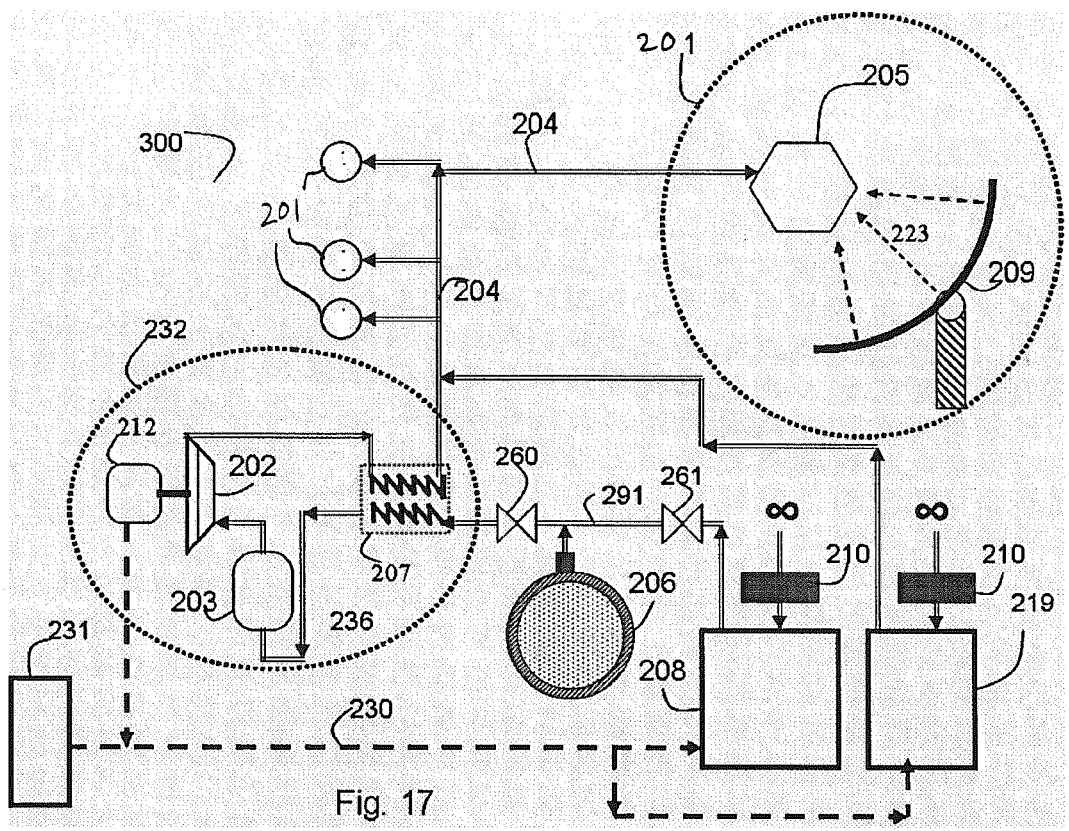
FIG. 17 is a schematic representation of a renewable energy power plant embodying the present invention.

FIG. 17 is a schematic representation of a renewable energy Power Plant 300, which embodies the present invention. The Power Plant 300 comprises as the primary elements: one or more solar Dish Modules 201, and preferably an array thereof an air compressor system 208, a compressed air storage vessel 206, and a Central Power Generator 232.

The Central Power Generator module 232 steps the pressure down from the high pressure stored in the vessel 232, and delivers air (or other gas) to an array of solar Dish Modules 201. The solar Dish Modules 201 are solar-powered gas turbine energy converters. The Central Power Module 232 serves as an efficient step-down pressure regulator for the solar Dish Modules 201 and produces electrical power. For economic reasons, it is preferable to store the air in the vessel 206 at pressures above the maximum allowable supply pressure for the solar Dish Modules 201. This invention allows for a reduction in the size of the compressed air storage module 206 and may improve overall efficiency of the power plant 300.

In FIG. 17, air is drawn into an air filter 210 of the air compressor 208 and delivered to the storage vessel 206 and the Central Power Module 232. During conditions where a valve 261 is open and a valve 260 is closed, the compressor is charging the storage vessel 206 and no power is generated from either the Central Power Module 232 or the solar Dish Modules 201.

During periods of maximum power generation, the compressor 208 is off and the valve 261 is closed. Stored air from the vessel 206 is delivered through the open valve 260, and enters a recuperator 207 of the Central Power Module 232 from a high-pressure conduit 291. The recuperator 207 is an air-to-gas heat exchanger used to recover waste heat from the lower pressure exhaust from an expander 202 of the Central Power Module 232. The pressurized air leaving the recuperator flows through conduit 236 into an Air Heater 203. The gas exiting the Air Heater 203 flows into the expander 202. The expander 202 works between two selected pressures, efficiently converting the pressure and enthalpy of the gas to useful shaft power. The shaft power is converted to electric power employing a generator 212 and, optionally, gearing.

The expander exhaust flows through the low-pressure side of the recuperator 207 and enters a conduit 204 at a moderate temperature. This gas, at a selected intermediate pressure, flows through fixed and flexible conduit to the array of solar Dish Modules 201.

The electricity from the generator 212 is wired to an electrical bus 230 so as to provide power to either the high-pressure compressor 208 for storage, the low-pressure compressor 219 for delivery to the manifold at conduit 204, or the delivery of surplus power to the utility interface device 231. The overall power exported or imported by the Power Plant may be controlled by the plant dispatcher and is generally dictated by the instantaneous wholesale price of electricity and/or the utility dispatcher who is charged with the responsibility to manage regional power generation assets.

The Air Heater 203 serves to raise the temperature and hence energy content of the air. The source of heat may be through combustion of hydrocarbon fuels, geothermal heat, or waste heat from an independent source. Options are discussed later in this disclosure.

The expander 202 serves to efficiently reduce the pressure from the storage vessel 206 to a level suitable for the Dish Modules 201. Whereas the solar Dish Module 201, due to structural and weight limitations, may tolerate moderate pressures, e.g., about 10 to 20 bars, there are economic reasons for significantly increasing the pressure in the storage vessel 206.

The solar Dish Module 201 is includes a solar concentrator 209 and a Solar Power Conversion Module 205. The solar concentrator 209 collects and focuses solar energy 223 into the Solar Power Conversion Module 205.

Figure 18:
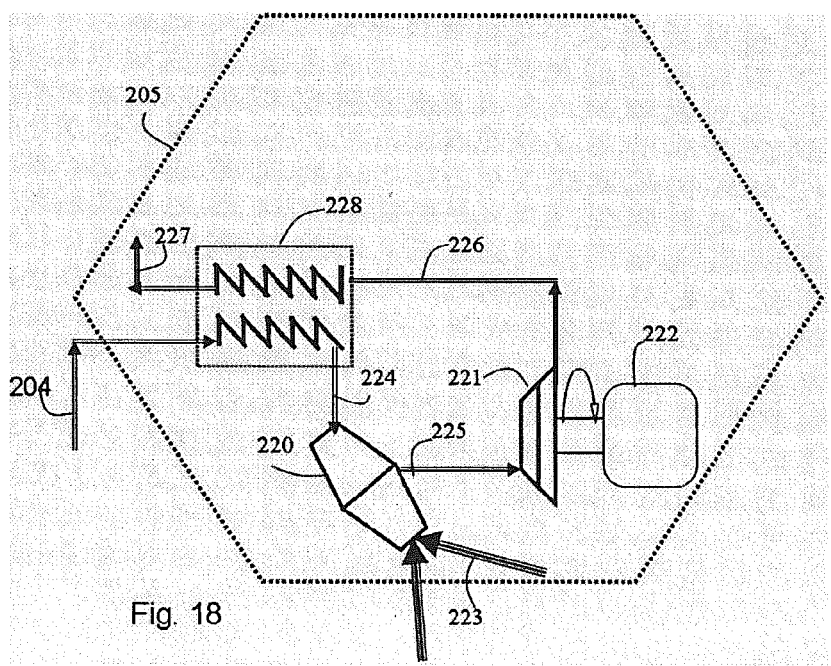
FIG. 18 is a schematic representation of a solar power conversion module.

FIG. 18 is a schematic representation of the Solar Power Conversion Module 205. The gas flow exhausted from the Central Power Generator 232 is received at the Dish Module 201 from the common manifold of conduit 204. The gas stream is preheated as it flows through a recuperator heat exchanger 228. A conduit 224 permits the preheated gas to flow into a Hybrid Solar Receiver 220. Within the receiver, the gas temperature is increased by energy derived from the concentrated sunlight 223. The Hybrid Solar Receiver 220 may also contain a combustion system for burning hydrocarbon fuels during periods of low solar intensity. The heated gas exiting the receiver 220 flows through a conduit 225 into a turbine or series of turbines represented schematically at 221. The series of one or more turbine stages 221 converts the gas enthalpy and pressure to useful shaft power. The shaft power is converted to electricity by an alternator or generator 222. The turbine exhaust, and nearly atmospheric pressure flows through a conduit 226 into the low-pressure side of the recuperator 228, liberating its heat to the cooler high-pressure supply flow entering the recuperator by conduit 204. The low pressure, low temperature gas is discharged to the atmosphere from a conduit 227.

A key feature of the invention is that it may be adapted to maintain maximum solar-to-electric conversion efficiency during changes in the external environment. The control of the Power Plant 300 may manage the three external variables listed in Table 1, and may adapt to maintain peak overall energy conversion efficiency.

TABLE 1

Three Categories of External Variables.

1. Solar power input 23 varies with time of day and environmental conditions.
2. In a typical operating mode, the air storage pressure declines over the course of the operating period. As pressure declines, the flow to the Solar Dish Modules must be adjusted to maintain turbine inlet temp 70 at its optimal and safe level.
3. The inevitable degradation of the Power Conversion Module through use is cause for interactive control system adjustments. Degradation may be the result of leakage of high-pressure gas, fouling or clogging within the heat exchangers, or stress-related distortion causing critical clearances within the turbomachinery to open.

The ability of the present system to adapt to these changes may be an important factor in achieving economic success. To maximize the economics of the power plant, the control system should perform at peak efficiency for many years of service. Two primary controllable parameters governing the system efficiency are the turbine 221 inlet temperature and the expander 202 inlet temperature.

The expander 202 may take the form of a single or multi-stage turbine or, alternatively, may employ piston technology. To adapt to natural changes in the supply pressure and deliver an optimal pressure and flow to the solar Dish Modules 201, the turbine expander 202 may employ a variable area nozzle. The variable nozzle interfaces with the overall control system to provide safe and efficient operation for the Power Plant 300.

Figure 19:
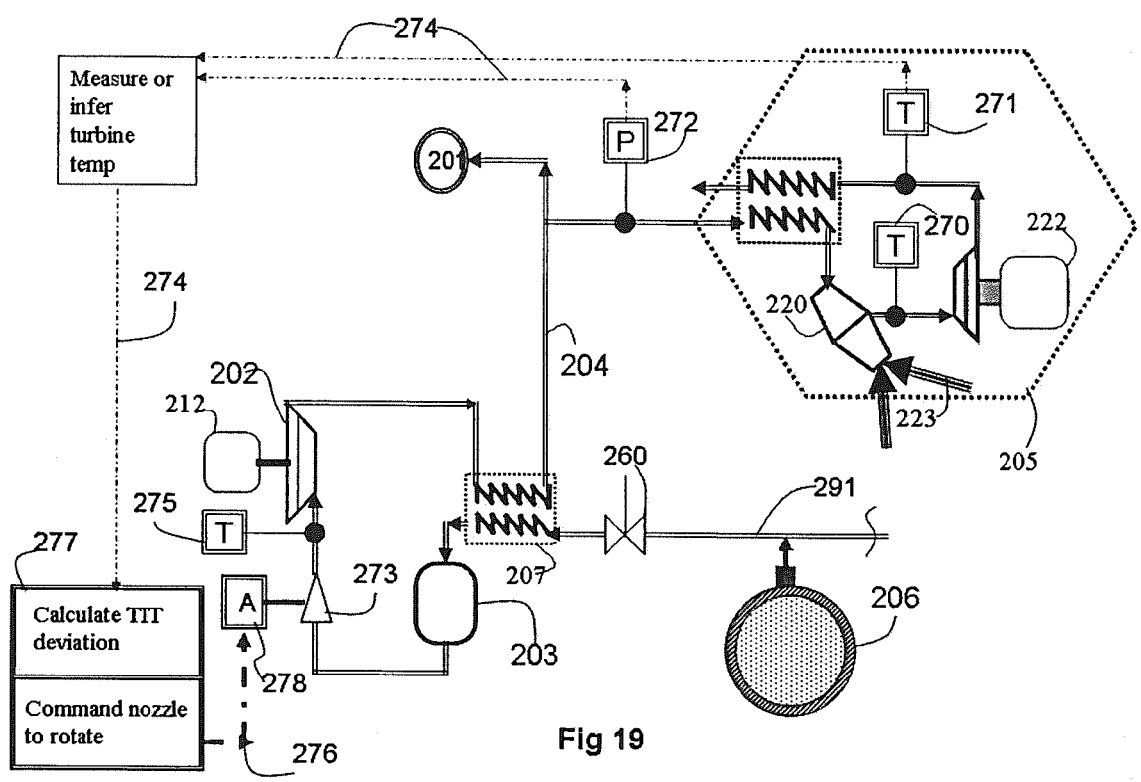
FIG. 19 illustrates a control system employing a variable area nozzle of the central power generator to maintain the flow and temperatures within the power conversion module.

FIG. 19 illustrates control logic using the variable area nozzle of the Central Power Generator 232 to maintain the flow and temperatures within the Power Conversion Module 205 within an optimum range. For example, during periods of sub-normal solar flux 223, the temperature 270 of the gas entering the turbine 221 will drop, thereby reducing the efficiency of the cycle and increasing the consumption of stored air in the vessel 206. An electrical signal 274 from inlet temperature sensor 270, or alternatively, an inferred estimation of temperature 270 using outlet temperature 271 with inlet pressure 272, is read into a microprocessor, microcontroller, or other programmable device 277.

A deviation between the true (i.e., detected or calculated) turbine inlet temperature 270 and a preselected or predetermined, e.g., optimal, inlet temperature value stored within the microprocessor 277 generates an error signal 276. As used herein the terms "value" and "set point" are also intended to encompass a range of permissible values. A threshold monitoring and control scheme, which may be a conventional scheme, such as proportional-integral-differential (PID) control logic or the like, monitors for error conditions. In the event of an error condition, the microprocessor 277 sends an analog output signal to an actuator 278.

The actuator 278 rotates the variable position turbine nozzle 273 to change the flow direction entering the turbine rotor of the expander 202. The position of the nozzle affects the flow through the circuit, including the pressure and mass flow supplied to the Dish Modules 201. For the example of the sub-normal solar insolation, the nozzle 273 would be commanded to reduce the flow, thereby raising the temperature at the turbine inlet 270 and maximizing efficiency.

In an alternative embodiment, a piston-type expander 202 may be employed in place of the turbine expander. The piston expander may be configured to operate with the same logic as described above for the variable area turbine nozzle 273. In the piston expander embodiment, the exhaust port timing and the speed of the piston may be regulated to change the mass flow and pressure supplied to the Dish Modules 201. The change in pressure and mass flow supplied to the Power Conversion Module 205 will be dictated by the microprocessor 277 and in response to solar insolation changes.

Both the turbine with variable position nozzle and the piston expander with variable speed and porting embodiments provide practical control solutions to maintain an optimal turbine inlet temperature 270 at the Dish Module 201 given the external variables. Control of the expander's actuator 278 effectively permits the Dish Modules 201 to receive the flow and pressure they require for the varying solar insolation, while the storage pressure in vessel 206 declines over the course of the power extraction period.

Figure 20:
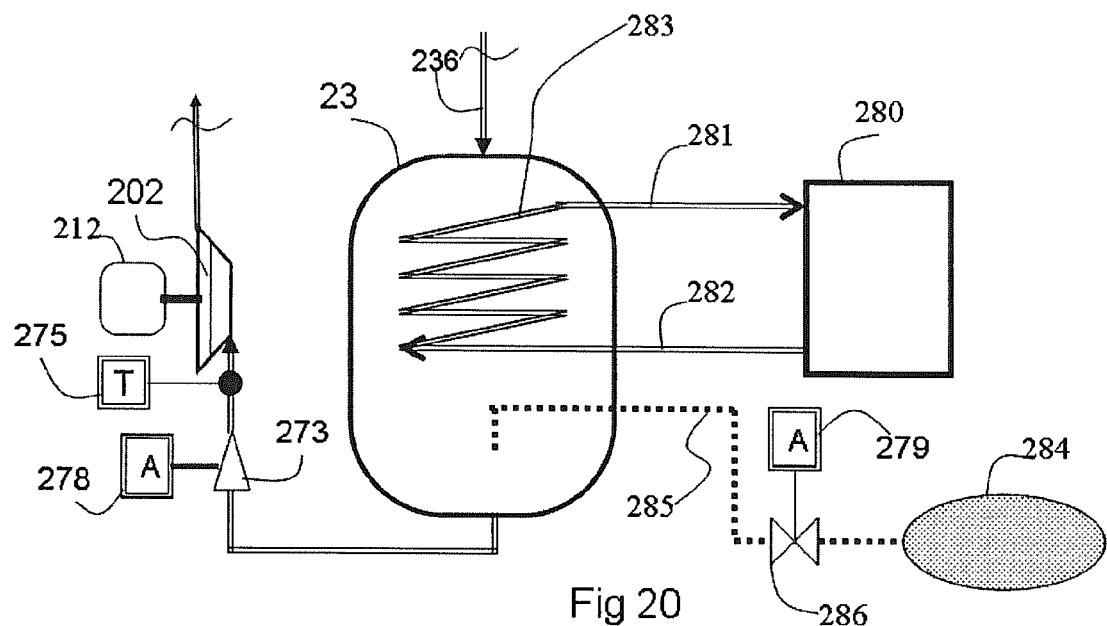
FIG. 20 illustrates the manner of controlling the heat source applied to gas entering the expander of the central power generator.

Depending upon the characteristics of the heat source, the Air Heater 203 may also require control to maintain efficient operation of the expander 202. FIG. 20 describes two principal scenarios. A Heat Source 280 circulates a secondary heating fluid to the air heater 203 through a conduit 282. A heat exchanger 283 provides a convective surface to transfer the heat between the secondary heating fluid from the heat source 280 and the air in the conduit 236 entering the Air Heater 203. A conduit 281 returns the secondary fluid to the heat source 280. The heat source 280 may be, for example, one or more of the following:

1. Waste heat.
2. Heat of compression from compressors.
3. Exhaust heat from a spark ignition, Diesel, or gas turbine engine.
4. Solar energy from flat-plate panels or troughs.
5. Geothermal energy.

These sources of energy may be categorized as nearly isothermal, as the temperature in the conduit 282 is not directly affected by the airflow through the expander 202. If the heat is derived from one or more of the above sources, a temperature 275 of the expander 202 inlet will change only slightly as the actuator 278 works to maintain the optimal temperature 270 at the Dish Module 201.

An alternative heat source for the Air Heater 203 is a hydrocarbon fuel, delivered from a container 284, through a conduit 285. Such fuel candidates include, for example:

1. Biomass derived fuels, including oils and gases.
2. Wood chips and solid waste pellets.
3. Landfill gas.
4. Organic waste gas or liquids.
5. Conventional fossil fuels.

Operation with such fuels requires interaction with the microprocessor controller 277 and permits operation at elevated expander inlet temperatures 275 and improved overall efficiency. In response to a change in the optimal expander inlet temperature set point 275, an actuator 279 controlling a valve 286 will be commanded by the microprocessor 277 to make the required correction. As this fuel delivery from the vessel 284 is controllable, the actuator 279 is a slave to the measured or inferred temperature at state point 270 in the solar Power Conversion Module 205. Peak overall efficiency may be maintained by adjusting the circuit flow rate through the turbine and expander using actuator 278 such that temperatures 270 and 275 remain as close to their maximum set point as the external variables (see Table 1) change.

Figure 21:
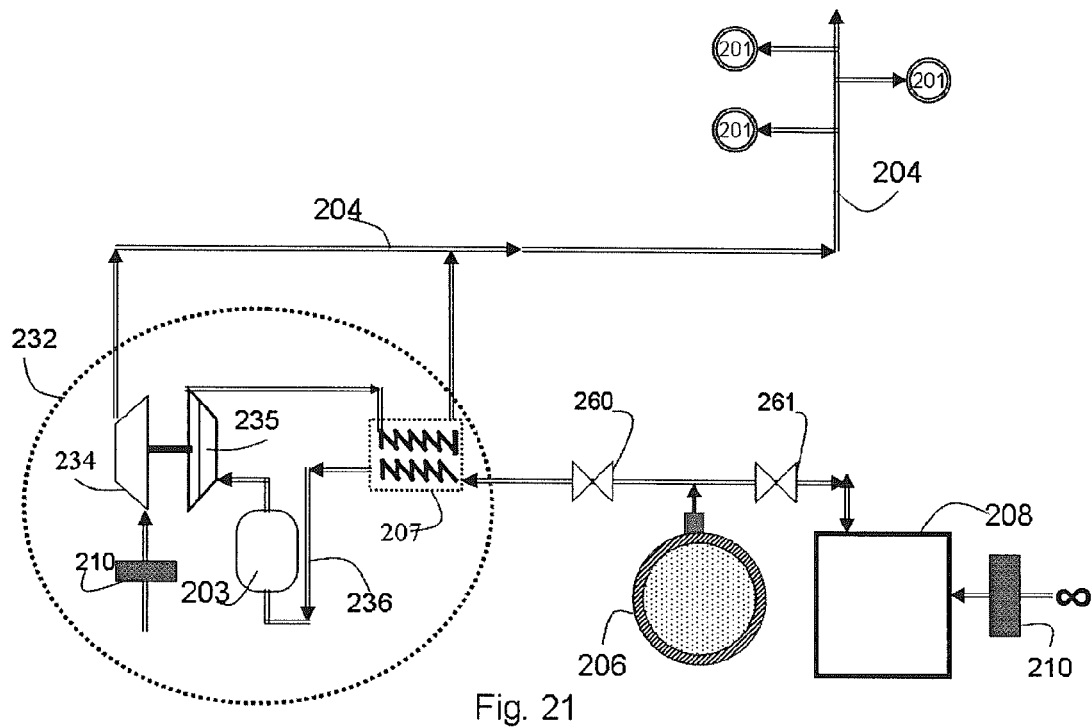
FIG. 21 depicts an alternative schematic depiction of a central power generator of the present invention.

An alternative schematic for the Central Power Generator 232 is shown in FIG. 21. Rather than producing electric power, the Central Power Generator 232 delivers shaft power directly to an air compressor 234. The necessary pressure let-down and flow-control functions provided by the expander 235 to control the Dish Module 201 remain the same as previously described in FIGS. 19 and 20. The compressed air produced from the expander 235 power is delivered at the pressure demanded by the solar Power Conversion Module 205.

Figure 22:
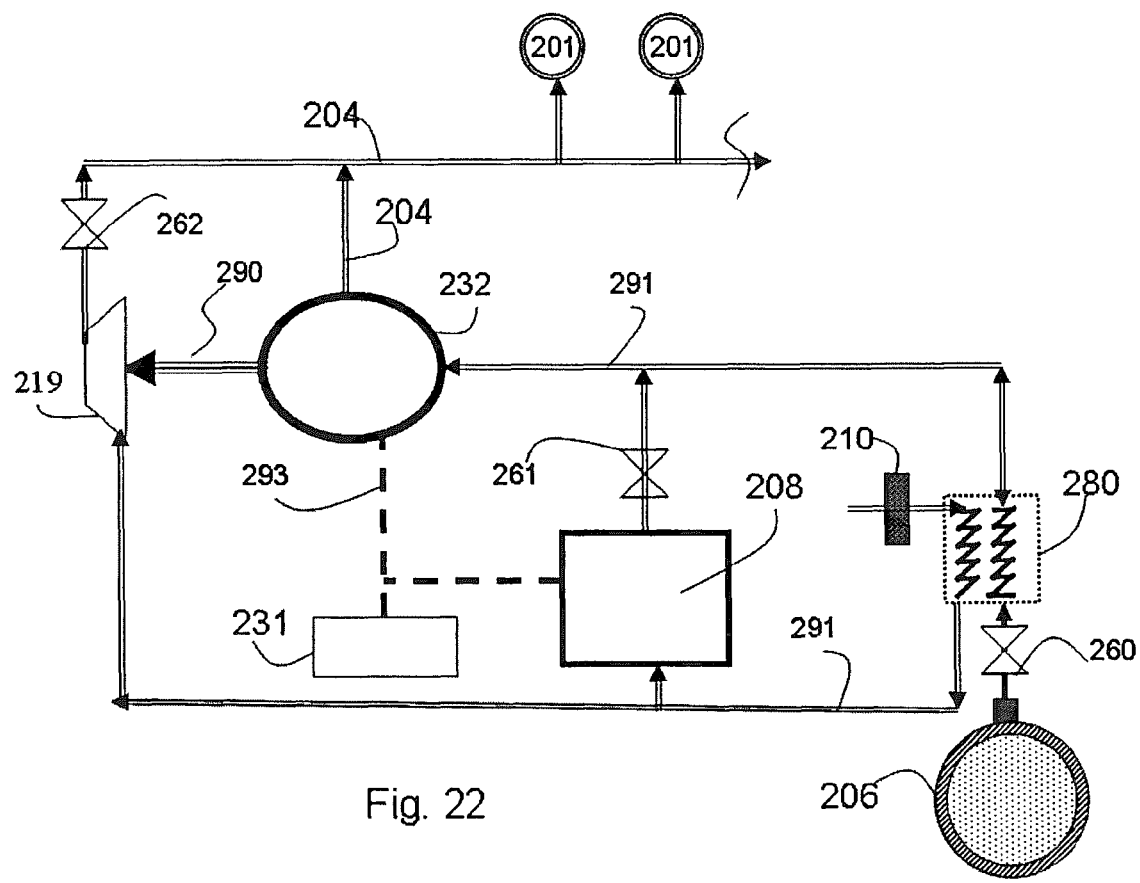
FIG. 22 is a generalized schematic of the embodiments depicted in FIGS. 17 and 21.

FIG. 22 provides a generalized schematic of the embodiments described in FIGS. 17 and 21. The Central Power Generator 232 delivers shaft power or electric power 290 to a low-pressure compressor 219 and/or electric power through wiring 293 to the high-pressure compressor 208 or the utility interface panel 231. The control of the Central Power Module 232 is as described in FIGS. 19 and 20.

To reduce the work of compression for either of the compressors 219 or 208 during periods of air extraction from the storage vessel 206, it is beneficial to place a heat exchanger 280 between the exit 260 of the tank and the inlet manifold 291 of the compressors 219 and 208. The cooling effect from expansion that occurs within the air storage vessel serves to reduce the inlet temperature entering the compressors 219 and 208, thereby reducing the work of compression.

The invention has been described with reference to the preferred embodiments. Modifications and alterations will occur to others upon a reading and understanding of the preceding disclosure herein, whereby it is to be distinctly understood that the foregoing descriptive matter is to be interpreted merely as illustrative of the invention and not as a limitation.

What is claimed is:

1. A power plant, comprising:
   a compressed air storage system including an air compressor and a compressed air storage vessel;
   two or more distributed power modules fluidically coupled in parallel to the compressed air storage system, each of said two or more distributed power modules further including a heat source;
   an expander device having an inlet fluidically coupled to said compressed air storage system, and an outlet fluidically said two or more distributed power modules, said expander for converting energy of a gas received at said inlet to mechanical power;
   a heat exchanger fluidically coupled to the expander device inlet and the expander device outlet for effecting a transfer of heat from gas exiting the expander device to gas entering the turbine expander;
   a generator connected to said expander device for converting mechanical power to electrical power;
   said expander device comprising a turbine expander having a rotatable shaft, an inlet fluidically coupled to said compressed air storage system, and an outlet fluidically said two or more distributed power modules, said turbine expander for converting energy of a gas received at said inlet to rotary shaft power;
   a controller for optimizing a speed of the turbine expander responsive to any one or more of temperature of an inlet gas, temperature of an outlet gas, pressure or an inlet gas, or pressure of an outlet gas; and
   a supplementary hydrogen or hydrocarbon-based selectable heat supply for heating a gas to be delivered to the inlet of said turbine expander.

2. A power plant, comprising:
   a source of compressed air including a compressed air storage vessel and one or more air compressors for charging said storage vessel;
   a first power generator module including a first recuperative heat exchanger, a first heat source, and a first expander turbine module;

said first recuperative heat exchanger fluidicly coupled to said storage vessel for preheating compressed air received from said storage vessel;

said first heat source fluidicly coupled to said first recuperative heat exchanger for heating preheated compressed air received from said first recuperative heat exchanger;

said first expander turbine module fluidicly coupled to said first heat source for receiving heated compressed air from said first heat source and generating rotary mechanical power from said heated compressed air, said first expander turbine module including a first shaft for power extraction;

a second power generation module including a second recuperative heat exchanger, a second heat source, and a second expander turbine module;

said second recuperative heat exchanger fluidicly coupled to said first expander turbine module for preheating air received from said first expander turbine module;

said second heat source fluidicly coupled to said second recuperative heat exchanger for heating preheated air received from said second recuperative heat exchanger; and said second expander turbine module fluidicly coupled to said second heat source for receiving heated air from said second heat source and generating rotary mechanical power from said heated air, said second expander turbine module including a second shaft connected to an electrical generator or alternator.

3. The power plant of claim 2, wherein said second heat source is a solar power concentrator comprising one or more reflective mirrors and a solar absorbing heat exchanger.

4. The power plant of claim 2, wherein said first shaft for power extraction is connected to an electrical generator or alternator.

5. The power plant of claim 2, wherein said first shaft for power extraction is connected to a mechanical drive shaft of an air compressor.

6. The power plant of claim 2, wherein said one or more air compressors includes a first air compressor fluidicly coupled to a second air compressor.

7. The power plant of claim 6, wherein said first air compressor is fluidicly connected to said second power generation module.

8. The power plant of claim 2, wherein said one or more air compressors includes a first, high pressure compressor and a second, low pressure compressor.

* * * * *